United States Patent
Pfadler et al.

(10) Patent No.: US 12,244,439 B2
(45) Date of Patent: Mar. 4, 2025

(54) ACCESS NODE, USER EQUIPMENT, AND CORRESPONDING APPARATUSES, METHODS AND COMPUTER PROGRAMS

(71) Applicant: FRAUNHOFER-GESELLSCHAFT ZUR FÖRDERUNG DER ANGEWANDTEN E.V., Munich (DE)

(72) Inventors: Andreas Pfadler, Berlin (DE); Slawomir Stanczek, Berlin (DE); Peter Jung, Berlin (DE)

(73) Assignee: FRAUNHOFER-GESELLSCHAFT ZUR FORDERUNG DER ANGEWANDTEN FORSCHUNG E.V. (DE)

( * ) Notice: Subject to any disclaimer, the term of this patent is extended or adjusted under 35 U.S.C. 154(b) by 396 days.

(21) Appl. No.: 17/756,260

(22) PCT Filed: Nov. 18, 2020

(86) PCT No.: PCT/EP2020/082491
§ 371 (c)(1),
(2) Date: May 20, 2022

(87) PCT Pub. No.: WO2021/099362
PCT Pub. Date: May 27, 2021

(65) Prior Publication Data
US 2022/0417062 A1 Dec. 29, 2022

(30) Foreign Application Priority Data
Nov. 20, 2019 (EP) .................... 19210374

(51) Int. Cl.
*H04L 25/02* (2006.01)
*H04L 5/00* (2006.01)
*H04L 27/26* (2006.01)

(52) U.S. Cl.
CPC ........ *H04L 25/0224* (2013.01); *H04L 5/0023* (2013.01); *H04L 5/0051* (2013.01); *H04L 27/2639* (2013.01); *H04L 27/26532* (2021.01)

(58) Field of Classification Search
None
See application file for complete search history.

(56) References Cited

U.S. PATENT DOCUMENTS 10,791,504 B2 9/2020 Liu et al.
11,038,733 B2 6/2021 Hadani et al.
(Continued)

FOREIGN PATENT DOCUMENTS

CN 107534925 A 1/2018
CN 108781160 A 11/2018
(Continued)

OTHER PUBLICATIONS

Office Action; Chinese Patent Application No. 202080080812.5; Oct. 17, 2022.
(Continued)

*Primary Examiner* — Phirin Sam
(74) *Attorney, Agent, or Firm* — Barnes & Thornburg LLP

(57) ABSTRACT

An access node, user equipment, apparatuses, methods, and computer programs for a communication system. An apparatus for a wireless transmitter device includes a transmitter module for transmitting wireless transmissions and a processing module, which controls the transmitter module. The processing module generates one or more transmit symbols in a Delay-Doppler domain to obtain a Delay-Doppler representation; transforms the Delay-Doppler representation into a Time-Frequency domain to obtain a Time-Frequency representation, the Time-Frequency representation having a first bandwidth and a first duration; adds pilot symbols to the (Continued)

Time-Frequency representation to obtain a Time-Frequency representation with an extended second bandwidth or an extended second duration; transforms the Time-Frequency representation with the extended second bandwidth or the extended second duration to the time domain to obtain a time domain representation; and transmits the time domain representation to a wireless receiver device.

17 Claims, 10 Drawing Sheets

(56) References Cited

U.S. PATENT DOCUMENTS

| | | |
|---|---|---|
| 2006/0239364 A1 | 10/2006 | Wilhelmsson |
| 2007/0217530 A1* | 9/2007 | Hosseinian ......... H04L 25/0228 375/260 |
| 2012/0033754 A1* | 2/2012 | Koorapaty .......... H04L 25/0232 375/340 |
| 2017/0012749 A1* | 1/2017 | Rakib ................. H04L 27/2639 |
| 2017/0303146 A1* | 10/2017 | Hadani ................ H04W 24/02 |
| 2018/0097554 A1* | 4/2018 | Guey ................. H04L 27/2607 |
| 2019/0238189 A1* | 8/2019 | Delfeld ................... H04J 11/00 |
| 2020/0259692 A1* | 8/2020 | Hadani .................. H04L 27/32 |
| 2021/0028877 A1* | 1/2021 | Rakib ....................... H04J 11/00 |
| 2023/0327919 A1* | 10/2023 | Hadani ................ H04W 24/02 370/252 |
| 2024/0056343 A1* | 2/2024 | Sathyanarayan ...... H01Q 21/28 |

FOREIGN PATENT DOCUMENTS

| | | |
|---|---|---|
| WO | 2017003952 A1 | 1/2017 |
| WO | 2017087706 A1 | 5/2017 |
| WO | 2017147439 A1 | 8/2017 |
| WO | 2018191309 A1 | 10/2018 |

OTHER PUBLICATIONS

Berger et al.; Application of Compressive Sensing to Sparse Channel Estimation; IEEE Communications Magazine; Nov. 2010.

Hadani et al.; Orthogonal Time Frequency Space Modulation; Wireless Communications and Networking Conference (WCNC); IEEE; 2017.

Hadani et al.; OTFS: A New Generation of Modulation Addressing the Challenges of 5G; arXiv preprint arXiv: 1802.02623; 2018.

Raviteja et al.; Embedded Pilot-Aided Channel Estimation for OTFS in Delay-Doppler Channels; IEEE Transactions on Vehicular Technology; May 2019; vol. 68, No. 5.

Shen et al.; Channel estimation for Orthogonal Time Frequency Space (OTFS) Massive MIMO; IEEE Transactions on Vehicle Technology; Aug. 15, 2019; vol. 67, No. 16.

Tauböck et al.; A Compressed Sensing Technique for OFDM Channel Estimation in Mobile Environments: Exploiting Channel Sparsity for Reducing Pilots; Proceedings IEEE ICASSP-08; Mar.-Apr. 2008; Las Vegas, Nevada.

Tauböck et al.; Compressive Estimation of Doubly Selective Channels in Multicarrier Systems: Leakage Effects and Sparsity-Enhancing Processing; IEEE Journal of Selected Topics in Signal Processing 4.2; 2010; pp. 255-271.

Search Report for European Patent Application No. 19210374.5; May 26, 2020.

Search Report for International Patent Application No. PCT/EP2020/082491; Feb. 5, 2021.

* cited by examiner

ACCESS NODE, USER EQUIPMENT, AND CORRESPONDING APPARATUSES, METHODS AND COMPUTER PROGRAMS

PRIORITY CLAIM

This patent application is a U.S. National Phase of International Patent Application No. PCT/EP2020/082491, filed 18 Nov. 2020, which claims priority to European Patent Application No. 19210374.5, filed 20 Nov. 2019, the disclosures of which are incorporated herein by reference in their entireties.

SUMMARY

Illustrative embodiments relate to an access node, user equipment, apparatuses, methods, and computer programs for a communication system, more particularly, but not exclusively, to a concept for pilot insertion and channel estimation in an Orthogonal Time Frequency Space (OTFS) system.

BRIEF DESCRIPTION OF THE DRAWINGS

Disclosed embodiments will be described in more detail with reference to the accompanying figures, in which.

DETAILED DESCRIPTION

Figure 1:
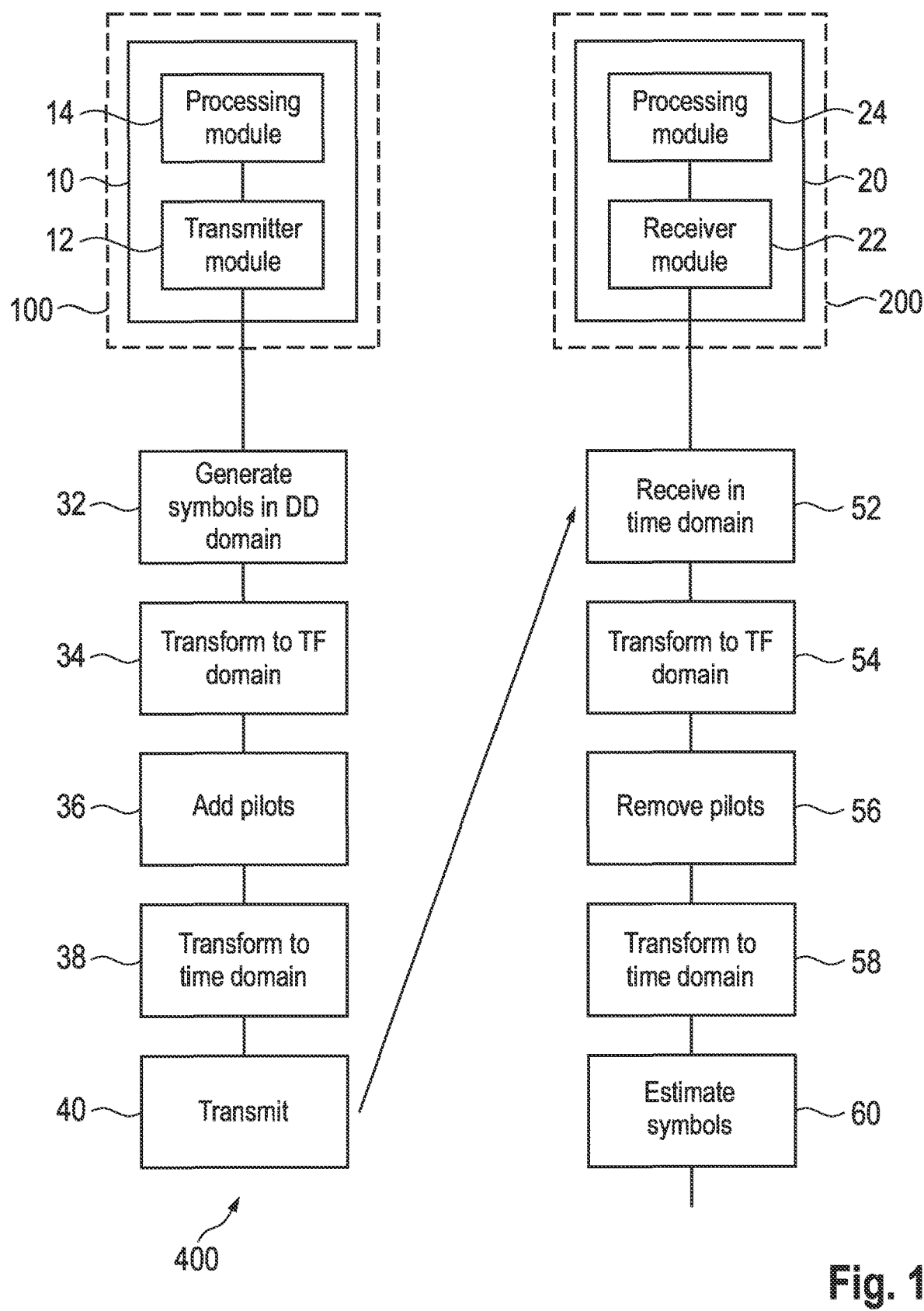
FIG. 1 illustrates block diagrams of exemplary embodiments of apparatuses for a wireless transmitter device and for a wireless receiver device, and exemplary embodiments of wireless transmitter and receiver devices.

New requirements in terms of reliability and efficiency in high mobility environments, such as vehicle-to-vehicle (V2V) communication, are pushing legacy systems to their limits. Orthogonal frequency-division multiplexing (OFDM) is a popular and well-known modulation scheme but it may suffer from substantial performance degradation and inflexibility in environments with high Doppler spreads. Consequently, novel modulation schemes may be considered and perused which are flexible, efficient and robust in doubly-dispersive channels.

Orthogonal time frequency and space (OTFS) was introduced by Hadani et. al as a promising recent combination of classical pulse-shaped Weyl-Heisenberg (or Gabor) multicarrier schemes with a distinct time-frequency (TF) spreading. Data symbols are spread with the symplectic finite Fourier transform (SFFT) over the whole time-frequency grid. This particular linear pre-coding accounts for the doubly-dispersive nature of time-varying multipath channels seen as linear combinations of time-frequency shifts. Several studies show that OTFS outperforms OFDM in such situations. Other research focus on a performance comparison of OFDM, generalized frequency division multiplexing (GFDM), and OTFS. It reveals significant benefits of OTFS in terms of bit error rate (BER) and frame error rate (FER) in relation to the others. With sufficient accurate channel information it offers a promising increase in terms of reliability and robustness for high mobility users when using sophisticated equalizers. So far, OTFS was researched with the assumption of perfect grid-matching, often with idealized pulses violating the uncertainty principle and in many cases with ideal channel knowledge (including the cross-talk channel coefficients).

OTFS is a new modulation scheme that addresses the challenges for of 5th Generation mobile communication systems (5G). The key idea behind OTFS is to multiplex a QAM (quadrature amplitude modulation) or QPSK (Quadrature Phase Shift Keying) symbol (data) in the signal representation called the delay-Doppler representation. To do channel equalization, the wireless channel needs to be estimated at the receiver. This can be done by the insertion of pilots at the transmitter. The a-priory known pilot tones can be used by the receiver to estimate the channel.

Document WO 2017/147439 A1 describes a wireless communication network, in which pilot signals are transmitted over a wireless communication channel by determining a maximum delay spread for a transmission channel, determining a maximum Doppler frequency spread for the transmission channel, and allocating a set of transmission resources in a time-frequency domain to a number of pilot signals based on the maximum delay spread and the maximum Doppler frequency spread.

In document WO 2018/191309 A1 wireless communication transmission and reception techniques are described. At a transmitter, source data bits are modulated into a number of constellation symbols. An invertible transform is applied to the constellation symbols, thereby resulting in mapping the transformed symbols into Nd elements in the time-frequency grid. A signal resulting from the invertible transform is transmitted over a communication channel.

Document WO 2017/087706 A1 discloses OTFS as a novel modulation scheme with significant benefits for 5G systems. The fundamental theory behind OTFS is presented in this paper as well as its benefits. A mathematical description of the doubly fading delay-Doppler channel is provided and a modulation that is tailored to this channel is developed. The time varying delay-Doppler channel is modeled in the time-frequency domain and a new domain (the OTFS domain) is derived where it is shown that the channel is transformed to a time invariant one and all symbols see the same SNR (signal-to-noise ratio). Facets of the modulation like delay and Doppler resolution are explored, and design and implementation issues like multiplexing multiple users and evaluating complexity are addressed. Finally, some performance results are presented, where the superiority of OTFS is demonstrated.

There is a demand for an improved channel estimation concept for OTFS which is accommodated by the disclosed apparatus, access node, user equipment, methods, and computer program.

Disclosed embodiments are based on the finding, that channel estimation can be enabled by inserting pilot symbols in the Time-Frequency (TF) domain in an OFTS system. It is a further finding, that bandwidth and/or duration of a TF representation can be extended to free up resources for the pilot symbols. Such duration and bandwidth extension can be reverted at a receiver leading to a TF representation being equal to one without any pilots.

Another finding is that a multiuser uplink pilot over-head can be reduced. If a pilot is sent in the delay-Doppler-domain each UE has its own pilot symbol and guard symbols to avoid interference. Disclosed embodiments may reduce the pilot overhead by insertion in a spread TF domain. More details on pilot insertion in the DD-domain can be found in Raviteja, Patchava, Khoa T. Phan, and Yi Hong, "Embedded Pilot-Aided Channel Estimation for OTFS in Delay-Doppler Channels." IEEE Transactions on Vehicular Technology 68.5 (2019): 4906-4917."

Disclosed embodiments provide an apparatus for a wireless transmitter device. The apparatus comprises a transmitter module for transmitting wireless transmissions and a processing module, which is configured to control the transmitter module. The processing module is further configured to generate one or more transmit symbols in a Delay-Doppler (DD) domain to obtain a DD representation and to transform the DD representation into a TF domain to obtain a TF representation. The TF representation has a first bandwidth and a first duration. The processing module is further configured to add pilot symbols to the TF representation to obtain a TF representation with an extended second bandwidth and/or an extended second duration. The processing module is configured to transform the TF representation with the extended second bandwidth or the extended second duration to the time domain to obtain a time domain representation, and to transmit the time domain representation to a wireless receiver device. Disclosed embodiments enable pilot symbol transmission in the TF domain by allowing bandwidth and/or time duration extension of a TF representation.

In some exemplary embodiments, the processing module may be configured to spread the TF representation having the first bandwidth and/or the first duration before adding the pilot symbols. A spreading operation (be it in time, frequency, or both) may generate resources in the TF-representation for inserting pilot symbols.

For example, the processing module may be configured to use an accordion-like spread to spread the TF representation having the first bandwidth or the first duration before adding the pilot symbols. An accordion-like spread may enable generation of well-defined pilot positions in the TF domain and may enable lossless de-spreading at a receiver.

The TF representation having the first bandwidth and/or the first duration may comprise a time-frequency grid. The processing module may be configured to extend the grid to open grid points for adding the pilot symbols. The additional grid points may be removed at the receiver and the original grid may be restored.

Furthermore, the processing module may be configured to add a pilot grid to the TF representation having the first bandwidth and the first duration, wherein spacings in the pilot grid are adapted to a coherence time of a wireless channel with reduced fast fading influence. Because of further processing in the DD domain, effects of multi-path superpositions (fast fading) and Doppler shifts may be reduced. Such a reduction may be beneficially exploited by using less pilots (wider pilot grid), which may increase the overall spectral efficiency.

Disclosed embodiments also provide an apparatus for a wireless receiver device. The apparatus comprises a receiver module for receiving wireless transmissions and a processing module configured to control the receiver module. The processing module is configured to receive a time domain representation of a signal from a wireless transmitter device and to transform the time domain representation to a TF representation. The TF representation has an extended bandwidth and/or an extended duration. The processing module is configured to remove pilot symbols from the TF representation to obtain a TF representation with an unextended bandwidth and/or an unextended duration. The processing module is configured to transform the TF representation with the unextended bandwidth and/or the unextended duration into a DD domain to obtain a DD representation and to determine estimated transmit symbols based on the DD representation. In exemplary embodiments, an efficient pilot transmission scheme may be implemented through pilot insertion and removal in the TF domain.

The processing module may be configured to estimate a wireless channel based on the pilot symbols and to determine the estimated transmit symbols based on the estimated wireless channel. Disclosed embodiments may enable an efficient channel estimation concept for OTFS.

In some exemplary embodiments, the processing module may be configured to carry out compressed sensing of the wireless channel based on the pilot symbols. Compressed sensing may enable an even coarser pilot grid in exemplary embodiments.

For example, the processing module may be configured to carry out the compressed sensing of the wireless channel based on the pilot symbols under the assumption that a representation of the wireless channel in the DD domain is sparse. Sparseness in the DD domain, where the transmit symbols are generated and estimated, may be beneficially exploited to enable compressed sensing at the receiver.

The TF representation having the extended bandwidth and/or the extended duration may comprise a TF grid. The processing module may be configured to delete the pilot symbols and pilot symbol grid points from the TF grid to obtain the TF representation with the unextended bandwidth and/or the unextended duration. Disclosed embodiments may enable an efficient concept for pilot insertion and removal.

Further exemplary embodiments are a wireless transmitter comprising the apparatus for the wireless transmitter device and a wireless receiver comprising the apparatus for the wireless receiver device. An access node of a wireless communication system comprising one of the above described apparatuses is another exemplary embodiment. User equipment for a wireless communication system comprising one of the above-described apparatuses is another exemplary embodiment. Likewise, a system with a wireless transmitter and a wireless receiver is another exemplary embodiment.

Disclosed embodiments further provide a method for a wireless transmitter device. The method comprises generating one or more transmit symbols in a DD domain to obtain a DD representation, and transforming the DD representation into a TF domain to obtain a TF representation. The TF representation has a first bandwidth and a first duration. The method further comprises adding pilot symbols to the TF representation to obtain a TF representation with an extended second bandwidth and/or an extended second duration. The method comprises transforming the TF representation with the extended second bandwidth and/or the extended second duration to the time domain to obtain a time domain representation, and transmitting the time domain representation to a wireless receiver device.

A method for a wireless receiver device is another exemplary embodiment. The method comprises receiving a time domain representation of a receive signal from a wireless transmitter device, and transforming the time domain representation to a TF representation. The TF representation has an extended bandwidth and/or an extended duration. The method further comprises removing pilot symbols from the TF representation to obtain a TF representation with an unextended bandwidth and/or an unextended duration. The method comprises transforming the TF representation with the unextended bandwidth and/or the unextended duration into a DD domain to obtain a DD representation, and determining estimated transmit symbols based on the DD representation.

Disclosed embodiments further provide a computer program having a program code for performing one or more of the above described methods, when the computer program is executed on a computer, processor, or programmable hardware component. A further exemplary embodiment is a computer readable storage medium storing instructions which, when executed by a computer, processor, or programmable hardware component, cause the computer to implement one of the methods described herein.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be similarly interpreted.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "includes" or "including", when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

FIG. 1 illustrates block diagrams of exemplary embodiments of apparatuses for a wireless transmitter device and for a wireless receiver device, and exemplary embodiments of wireless transmitter and receiver devices. FIG. 1 shows an exemplary embodiment of an apparatus 10 for a wireless transmitter device 100. The apparatus 10 comprises a transmitter module 12 for transmitting wireless transmissions and a processing module 14, which is coupled with the transmitter module 12. The processing module 14 is configured to control the transmitter module 12 and to generate 32 one or more transmit symbols in a Delay-Doppler (DD) domain to obtain a DD representation. The processing module 14 is further configured to transform 34 the DD representation into a TF domain to obtain a TF representation. The TF representation has a first bandwidth and a first duration. The processing module 14 is further configured to add 36 pilot symbols to the TF representation to obtain a TF representation with an extended second bandwidth and/or an extended second duration. That is to say with an extended second bandwidth and an unextended duration, with an unextended bandwidth and an extended second duration, or with an second extended bandwidth and an second extended duration. The processing module 14 is configured to transform 38 the Time-Frequency representation with the extended second bandwidth and/or the extended second duration to the time domain to obtain a time domain representation. The processing module 14 is further configured to transmit the time domain representation to a wireless receiver device 200 using the transmitter module 12. FIG. 1 further illustrates an exemplary embodiment of a wireless transmitter device 100 comprising the apparatus 10.

FIG. 1 further illustrates an exemplary embodiment of an apparatus 20 for a wireless receiver device 200. The apparatus 20 comprises a receiver module 22 for receiving wireless transmissions and a processing module 24, which is coupled with the receiver module 22. The processing module 24 is configured to control the receiver module 22 and to receive 52 a time domain representation of a signal from a wireless transmitter device 100. The processing module 24 is configured to transform 54 the time domain representation to a TF representation. The TF representation has an extended bandwidth and/or an extended duration. The processing module 24 is configured to remove 56 pilot symbols from the TF representation to obtain a TF representation with an unextended bandwidth and/or an unextended duration (either one or both). The processing module 24 is further configured to transform 58 the TF representation with the unextended bandwidth and/or the unextended duration into a DD domain to obtain a DD representation, and to determine estimated transmit symbols based on the DD representation. FIG. 1 further illustrates an exemplary embodiment of a wireless receiver device 200 comprising the apparatus 20.

FIG. 1 further illustrates an exemplary embodiment of a system 400 comprising a wireless transmitter 100 and a wireless receiver 200. A further exemplary embodiment is a method for a system comprising the method as performed by the transmitter apparatus 10 and the method as performed by the receiver apparatus 20.

The transmitter and receiver modules 12, 22 may be implemented as any method or mechanism for transmitting, receiving or transceiving, i.e., receiving and/or transmitting etc., one or more transmitter/receiver units, one or more transmitter/receiver devices and it may comprise typical receiver and/or transmitter components, such as one or more elements of the group of one or more Low-Noise Amplifiers (LNAs), one or more Power Amplifiers (PAs), one or more filters or filter circuitry, one or more diplexers, one or more duplexers, one or more Analog-to-Digital converters (A/D), one or more Digital-to-Analog converters (D/A), one or more modulators or demodulators, one or more mixers, one or more antennas, etc. In some exemplary embodiments, the processing modules 14, 24 may provide some functionality that may be found in transceiver modules. For example, the processing modules 14, 24 may be processing modules of the transmitter/receiver/transceiver modules 12, 22, and may comprise one or more filters or filter circuitry and/or one or more modulators or demodulators.

In exemplary embodiments, the processing modules 14, 24 may be implemented using one or more processing units, one or more processing devices, any method or mechanism for processing, such as a processor, a computer or a programmable hardware component being operable with accordingly adapted software. In other words, the described function of the processing module 24 may as well be implemented in software, which is then executed on one or more programmable hardware components. Such hardware components may comprise a general-purpose processor, a Digital Signal Processor (DSP), a micro-controller, etc. The respective processing modules 14, 24 may be configured to carry out any of the methods described herein.

The wireless devices may be any devices of a wireless communication system using OTFS, e.g., a mobile communication system, a broadcast system, a unicast system etc.

Figure 2:
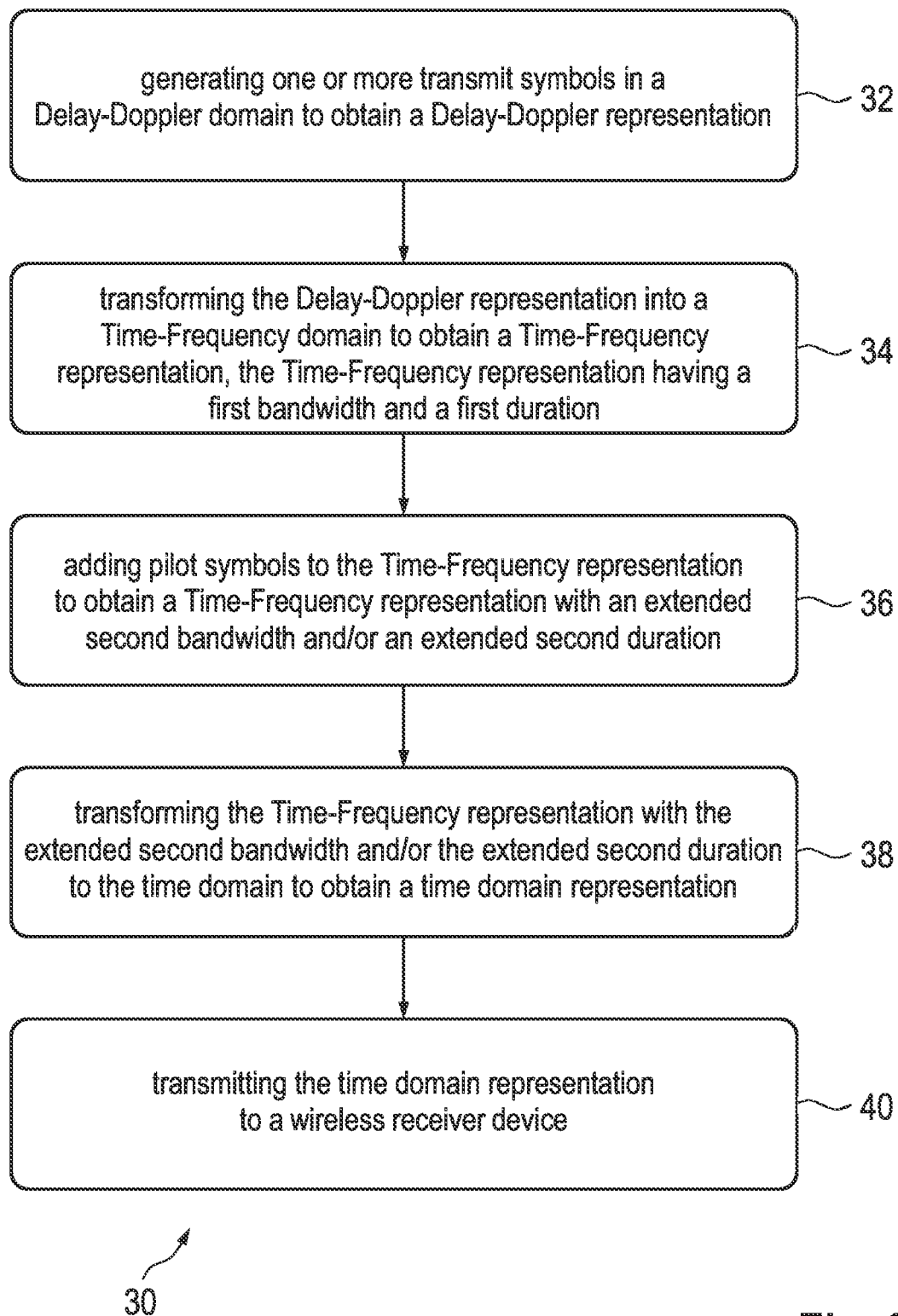
FIG. 2 illustrates a block diagram of an exemplary embodiment of a method for a wireless transmitter device.

FIG. 2 illustrates a block diagram of an exemplary embodiment of a method 30 for a wireless transmitter device 100. The method 30 comprises generating 32 one or more transmit symbols in a DD domain to obtain a DD representation and transforming 34 the DD representation into a TF domain to obtain a TF representation. The TF representation has a first bandwidth and a first duration. The method 30 further comprises adding 36 pilot symbols to the TF representation to obtain a TF representation with an extended second bandwidth and/or an extended second duration, and transforming 38 the TF representation with the extended second bandwidth and/or the extended second duration to the time domain to obtain a time domain representation. The method 30 comprises transmitting 40 the time domain representation to a wireless receiver device 200.

Figure 3:
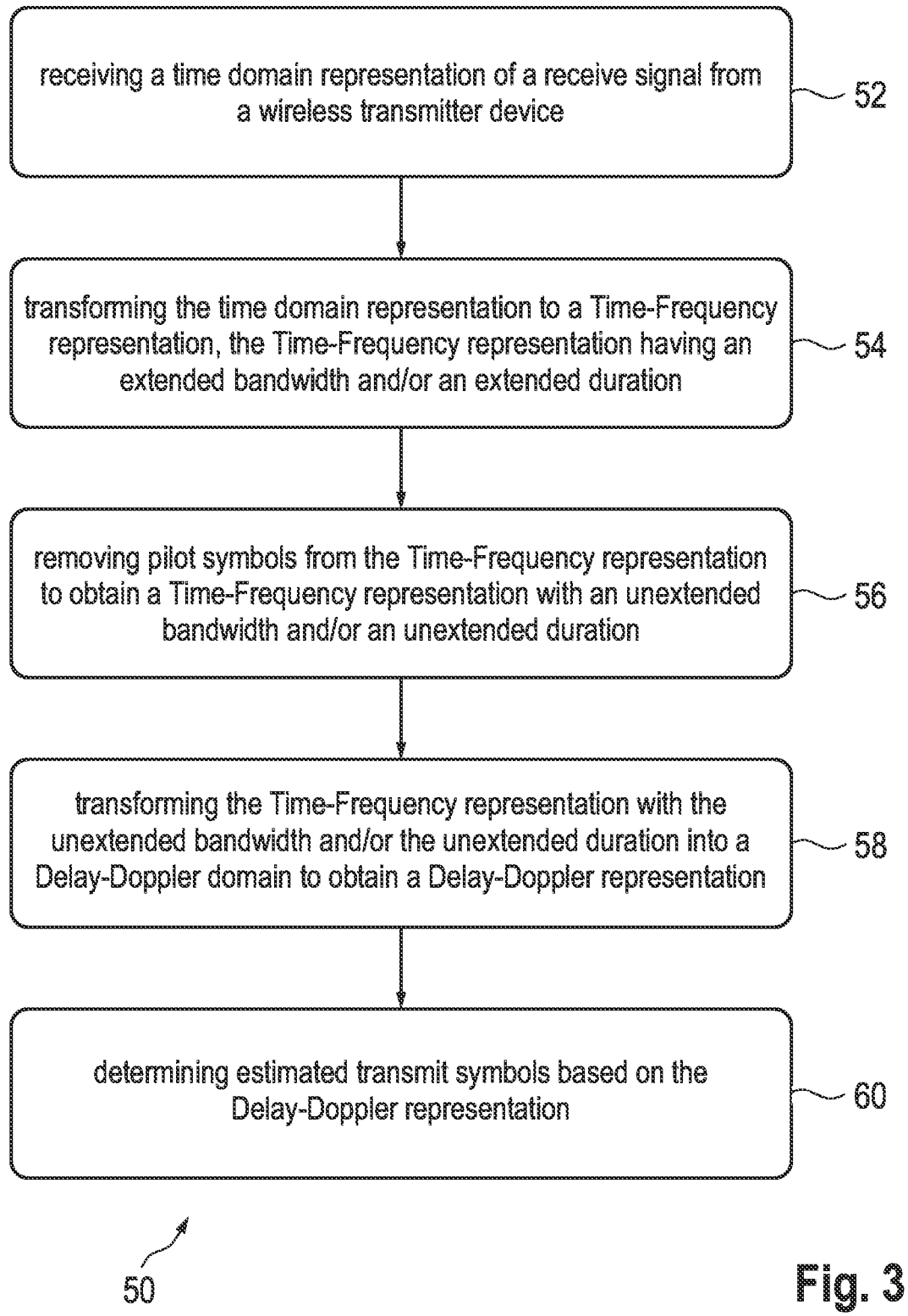
FIG. 3 illustrates a block diagram of an exemplary embodiment of a method for a wireless receiver device.

FIG. 3 illustrates a block diagram of an exemplary embodiment of a method 50 for a wireless receiver device 200. The method 50 comprises receiving 52 a time domain representation of a receive signal from a wireless transmitter device 100, and transforming 54 the time domain representation to a TF representation. The TF representation has an extended bandwidth and/or an extended duration. The method 50 further comprises removing 56 pilot symbols from the TF representation to obtain a TF representation with an unextended bandwidth and/or an unextended duration, and transforming 58 the TF representation with the unextended bandwidth and/or the unextended duration into a DD domain to obtain a DD representation. The method 50 further comprises determining 60 estimated transmit symbols based on the DD representation.

Figure 4:
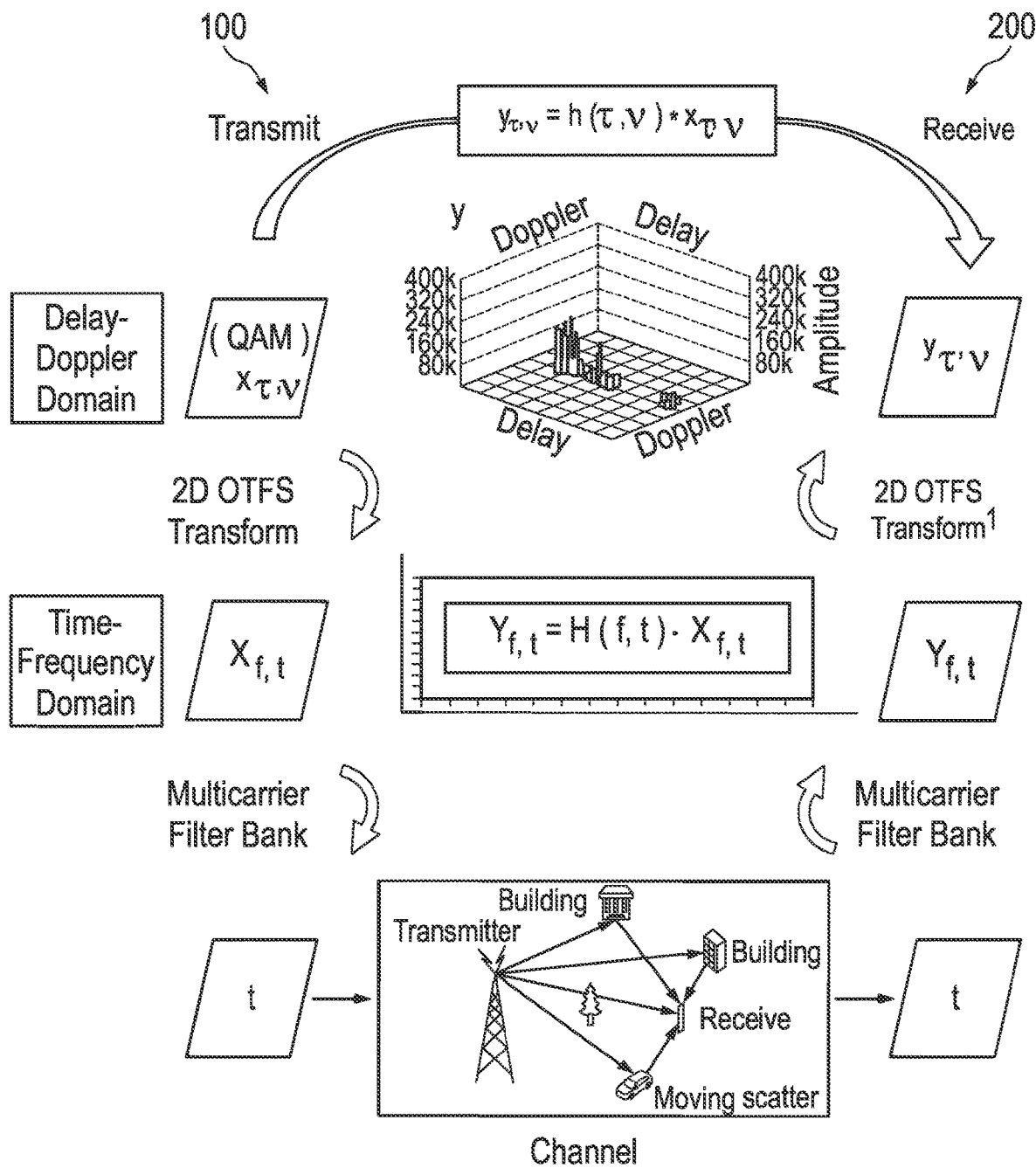
FIG. 4 shows multicarrier OTFS processing operations in an exemplary embodiment.

FIG. 4 shows multicarrier OTFS processing operations in an exemplary embodiment. FIG. 4 shows transmitter processing on the left and receiver processing on the right. At the top left, the transmitter composes transmit symbols in the DD domain. Quadrature amplitude modulated (QAM) transmit symbols $x_{\tau,\nu}$ are inserted into a grid in the DD domain to obtain a DD transmitter representation. This DD transmitter representation is then transformed into the TF domain using a two-dimensional transformation, e.g., a symplectic Fourier transform, which will be detailed subsequently. Another transform or a multicarrier filter bank is then used to transform the TF representation into the time domain, where the signal is transmitted to the receiver 200. The channel in the time domain is the well-known multi-path wireless channel.

At the receiver 200 the signal, which is distorted by the wireless channel, is received in the time domain and transformed or filtered into the TF domain. From the TF domain the signal can be transform back into the DD domain to obtain receive symbols $y_{\tau,\nu}$, based on which the transmit symbols are estimated. In the DD domain $x_{\tau,\nu}=h(\tau,\nu)*x_{\tau,\nu}$, where $h(\tau,\nu)$ represents the wireless channel in the DD domain. As known in the TF domain the effects of the radio channel may be represented using the according spectra $Y_{f,t}=H(f,t) \cdot X_{f,t}$. For example, such a modulation scheme called OTFS addresses the challenges for 5G. The key idea behind OTFS is to multiplex a QAM symbol (data) in the DD signal representation.

FIG. 4 shows the three used domains for OTFS:

First, the delay-Doppler-domain (DD-domain), where the data symbol is placed;

Second, the time-frequency domain (TF-domain); and

Third, the time domain, where the waveform is transmitted through the channel. There are two changes of domains realized by two 2D transforms (or filter bank operations).

The first and most important transform (principle behind OTFS modulation) is the OTFS transform from the DD-domain to the TF-domain, which can be described as $$X[n,m] = \frac{1}{NM} \sum_{k=0}^{N-1} \sum_{l=0}^{M-1} x[k,l] e^{j*2\pi*\left(\frac{ml}{M}-\frac{nk}{N}\right)} \quad (1)$$

Figure 5:
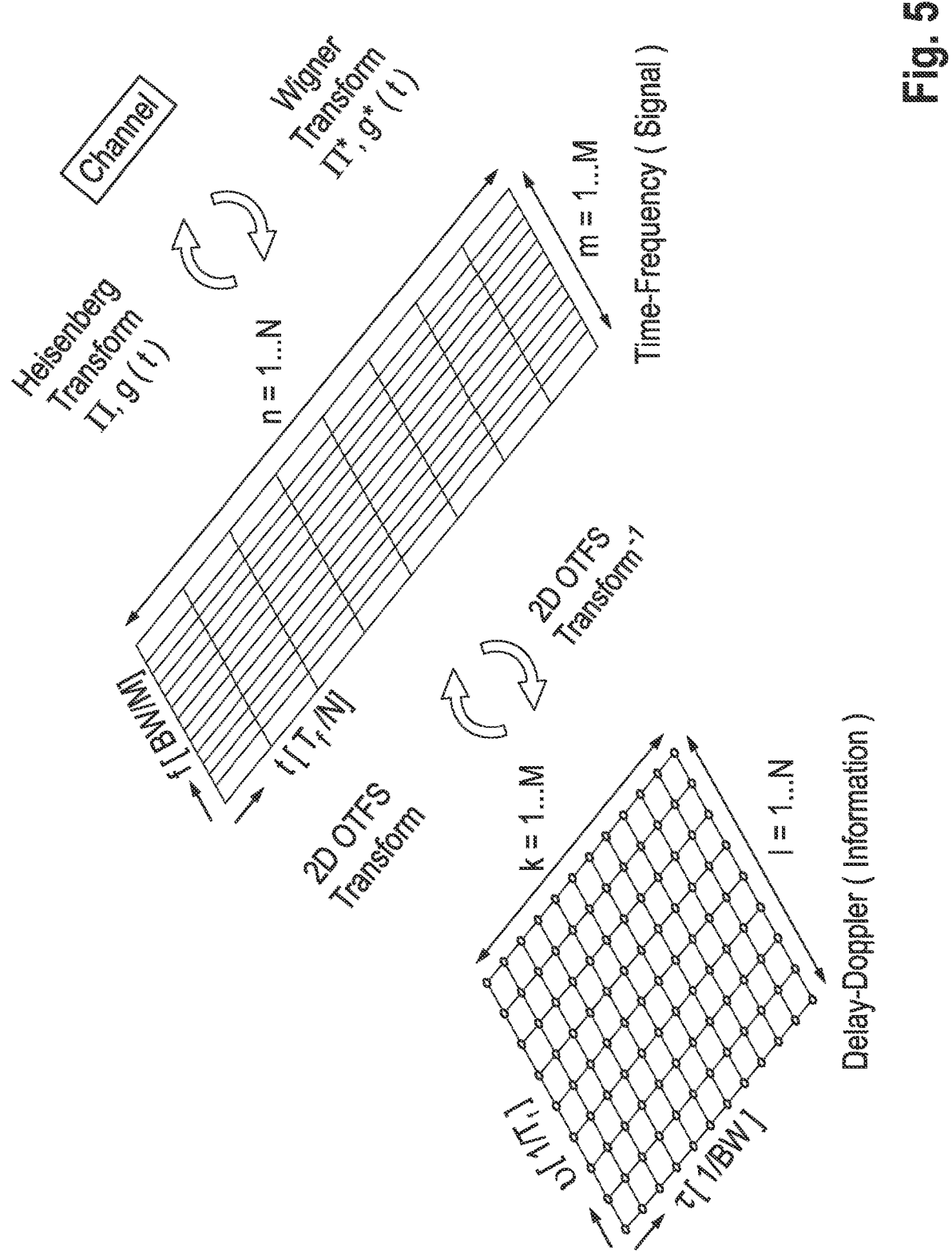
FIG. 5 illustrates symplectic Fourier duality in an exemplary embodiment.

N (indexed by n) and M (indexed by m) correspond to the number of symbols and subcarrier, respectively. FIG. 5 illustrates symplectic Fourier duality in an exemplary embodiment. Furthermore, [k,l] corresponds to each delay-Doppler QAM symbol and X[n,m] to the spread or "code" in the TF-domain. FIG. 5 shows the DD domain at the bottom left, the TF domain in the middle, and the time domain at the top right. The grid in the DD domain is determined by the bandwidth (1/BW) in the TF domain and the duration T1 of a radio frame in the TF domain. As known for these transformations the sampling duration in one domain may determine resolution in the other domain and vice versa. The Heisenberg transform is one candidate to transform from the TF domain to the time domain and the Wigner transform is a candidate to transform back from the time domain to the TF domain. These transforms are also called Gabor (or Weyl-Heisenberg) transform (Gabor synthesis filterbank corresponds to a Heisenberg transform and Gabor Analysis Filterbank corresponds to a Wigner transform).

The OTFS transform can be seen as the following basis function (time-frequency spreading):

$$B_{nm}(k,l) = e^{j*2\pi*\left(\frac{nk}{N}-\frac{ml}{M}\right)} \quad (2)$$

Figure 6:
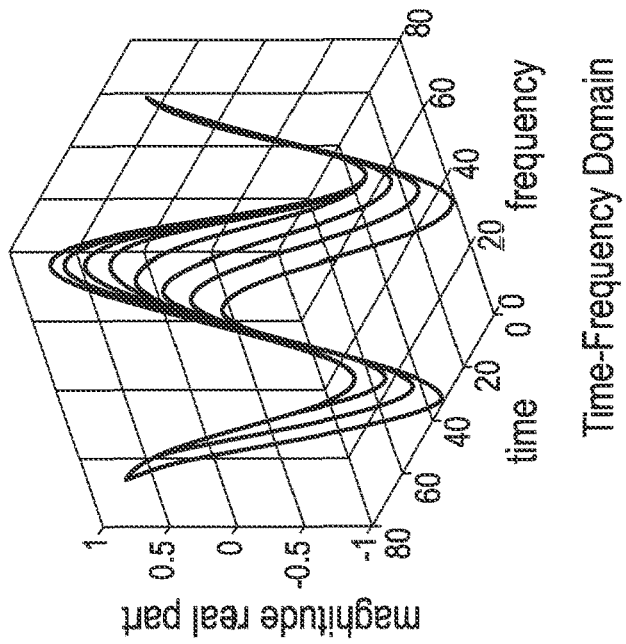
FIG. 6 depicts an example for an OTFS basis function, which spreads one symbol in the DD domain over the entire time-frequency-domain in an exemplary embodiment.
Figure 6:
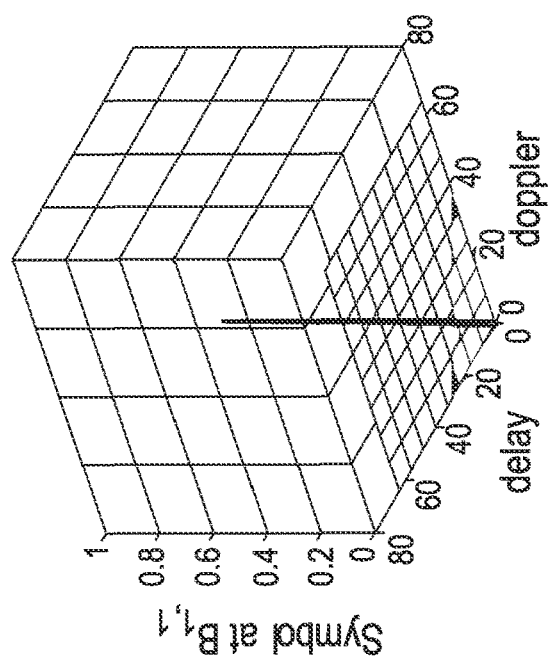
Figure 7:
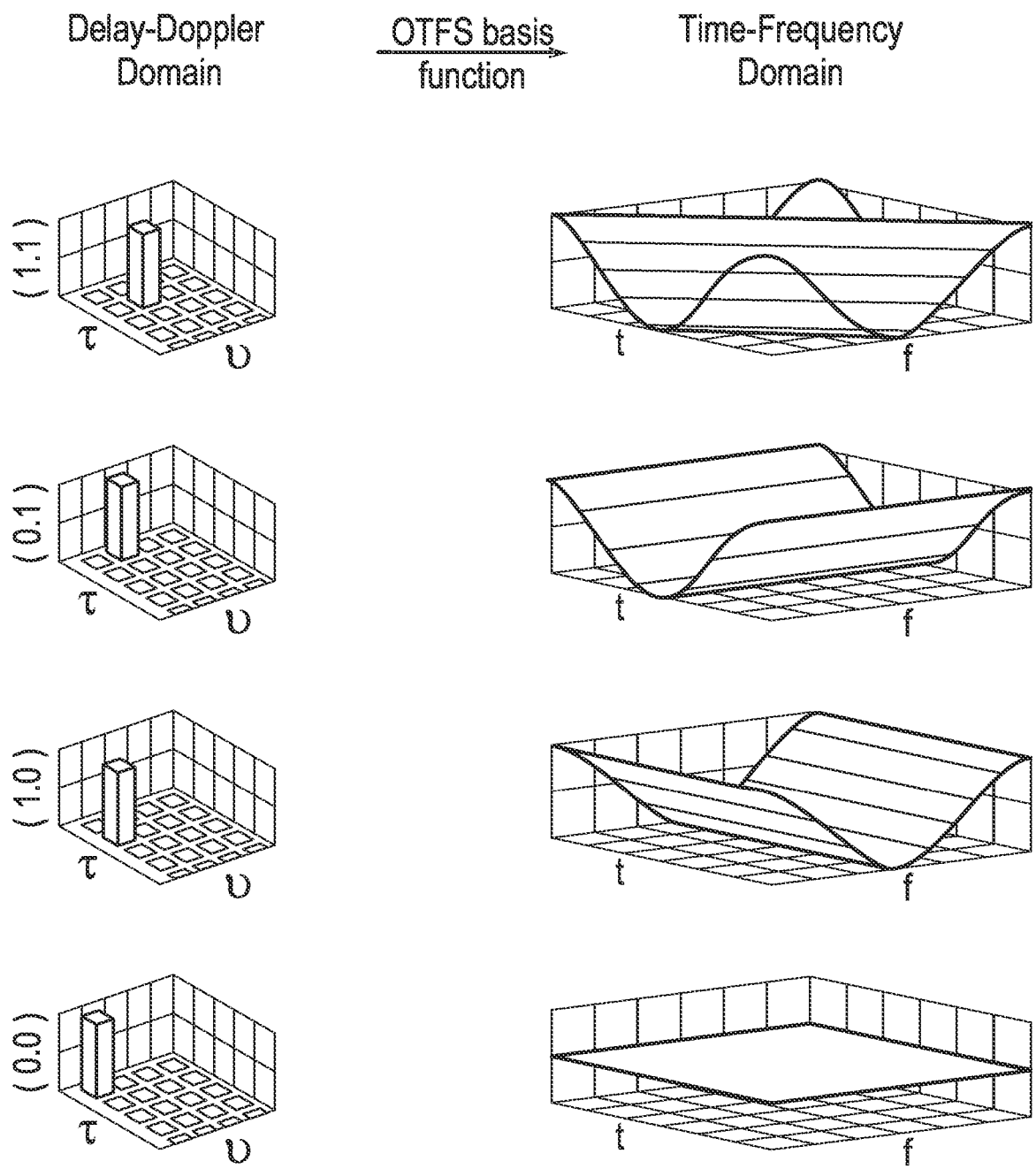
FIG. 7 shows examples for an OTFS basis function which spreads the symbols in the time-frequency domain in an exemplary embodiment.

FIG. 6 depicts an example for an OTFS basis function, which spreads one symbol in the DD domain over the entire TF-domain in an exemplary embodiment. The one symbol in the DD domain is shown on the left as a sharp pulse at grid point 0,0 (0 delay, 0 Doppler). For each QAM symbol (depending on position) the resulting waveform is spread over the time-frequency domain is different. FIG. 6 shows such a waveform in the TF domain on the right. This is further illustrated in FIG. 7, which shows examples for an OTFS basis function, which spreads the symbols in the time-frequency domain in an exemplary embodiment. Different symbol positions in the DD domain result in different waveforms in the TF domain.

The second 2D transform is called Heisenberg transform and can be seen as a legacy multicarrier transform as used for OFDM (orthogonal frequency division multiplexing), if it is a one-dimensional transform, i.e., N=1, and a rectangular pulse is used.

$$x(t) = \sum_{n=0}^{N-1}\sum_{m=0}^{M-1} X[n,m]\varphi_{tx}(t-nT)e^{-2\pi*m*\Delta f*(t-nT)}$$

Where $\varphi_{tx}$ is the transmit pulse, which has to be orthogonal with the receive pulse. For more information about OTFS the reader is encouraged to read Hadani, Ronny, and Anton Monk, "OTFS: A new generation of modulation addressing the challenges of 5G." arXiv preprint arXiv:1802.02623 (2018); and Hadani, Ronny, et al., "Orthogonal time frequency space modulation." Wireless Communications and Networking Conference (WCNC), 2017 IEEE, IEEE, 2017.

After introducing OTFS, compressive sensing for pilot-based channel estimation will be illuminated in the following. Compressive sensing methods or mechanisms to compressively sense a compressible signal. In other words, just take some measurements to estimate the signal because the signal is compressible anyway. In our case the delay-Doppler domain is very sparse (many zeros) if you compare it to its dual in the TF-domain. Sparsity in one domain is a necessary condition to use compressive sensing.

It has already been shown that with the use of compressive sensing the spectral efficiency can be increased for pulse-shaping multicarrier systems, cf. Tauböck, Georg, et al. "Compressive estimation of doubly selective channels in multicarrier systems: Leakage effects and sparsity-enhancing processing", IEEE Journal of Selected Topics in Signal Processing 4.2 (2010): 255-271; Tauböck, Georg, et al. "A COMPRESSED SENSING TECHNIQUE FOR OFDM CHANNEL ESTIMATION IN MOBILE ENVIRONMENTS: EXPLOITING CHANNEL SPARSITY FOR REDUCING PILOTS", in Proceedings IEEE ICASSP-08, Las Vegas, NV, March-April, 2008; and Christin R. Berger et al. "Application of Compressive Sensing to Sparse Channel Estimation", IEEE Communications Magazine, November 2010.

For multicarrier systems QAM symbols can be inserted in the TF domain, which are not spread over the entire time-frequency domain. To use compressive sensing, the pilots need to be well distributed over the entire TF-domain. Therefore, compressive sensing is not directly applicable for OTFS and has not been studied so far. Disclosed embodiments may enable compressive sensing for OTFS (of for spreading waveforms).

Figure 8:
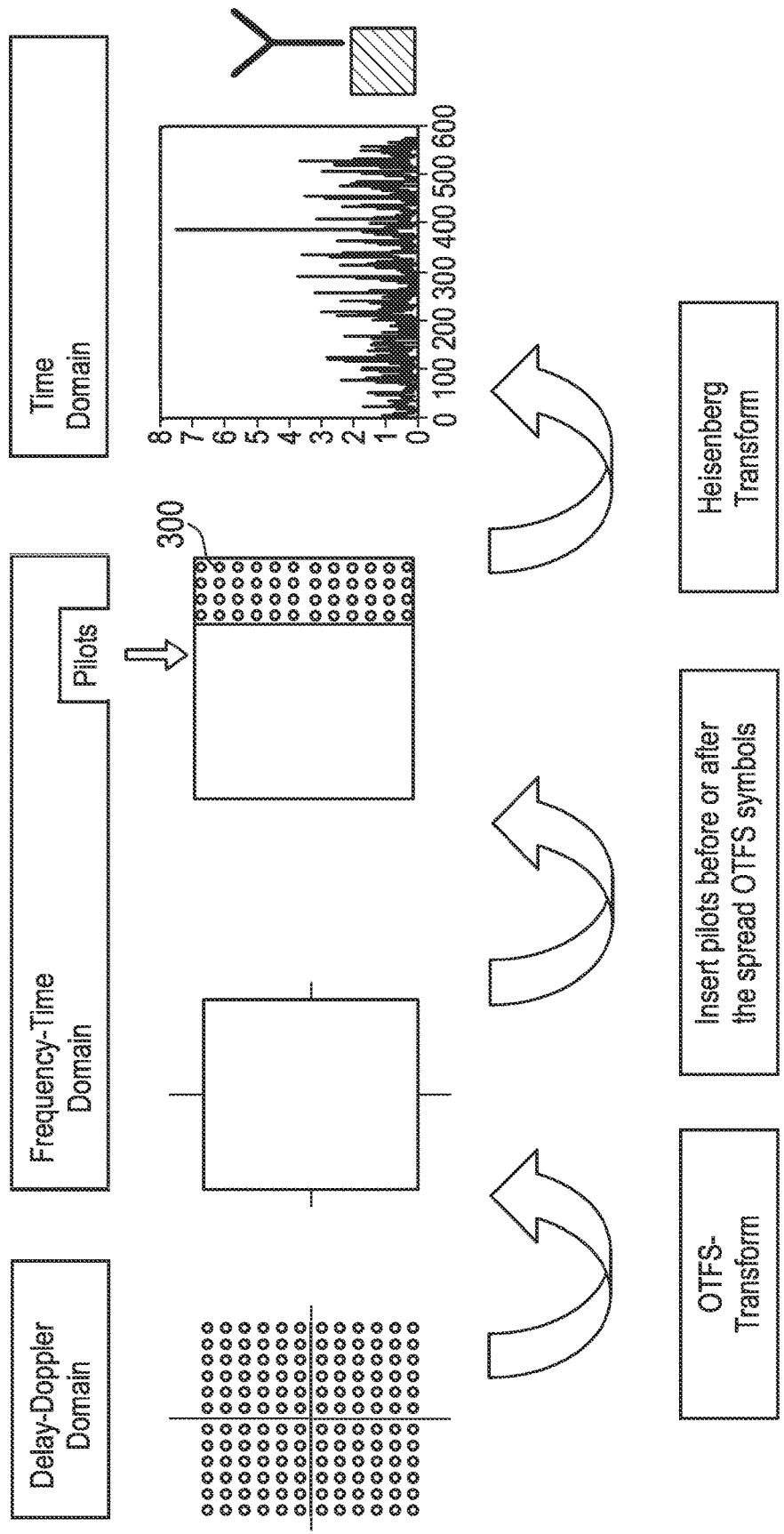
FIG. 8 illustrates an approach of pilot insertion before or after the OTFS symbols.

Disclosed embodiments may enable channel estimation for modulation schemes like OTFS, where symbols are spread over the entire time-domain. FIG. 8 shows a possible approach of inserting pilots before or after (pre- or post-amble) the spread OTFS symbols in the TF-representation. FIG. 8 shows the DD domain on the left, which is transformed into the TF-domain using an OFTS transform. The TF-domain is shown in the middle. Pilot symbols 300 can then be inserted before or after the OFTS symbols in the TF-domain. A Heisenberg transform is used to transform the TF-representation with pilots into the time domain before transmission.

As shown in FIG. 8 the pilots 300 can be appended in the TF domain to extend the duration only, the bandwidth only, or both.

Figure 9:
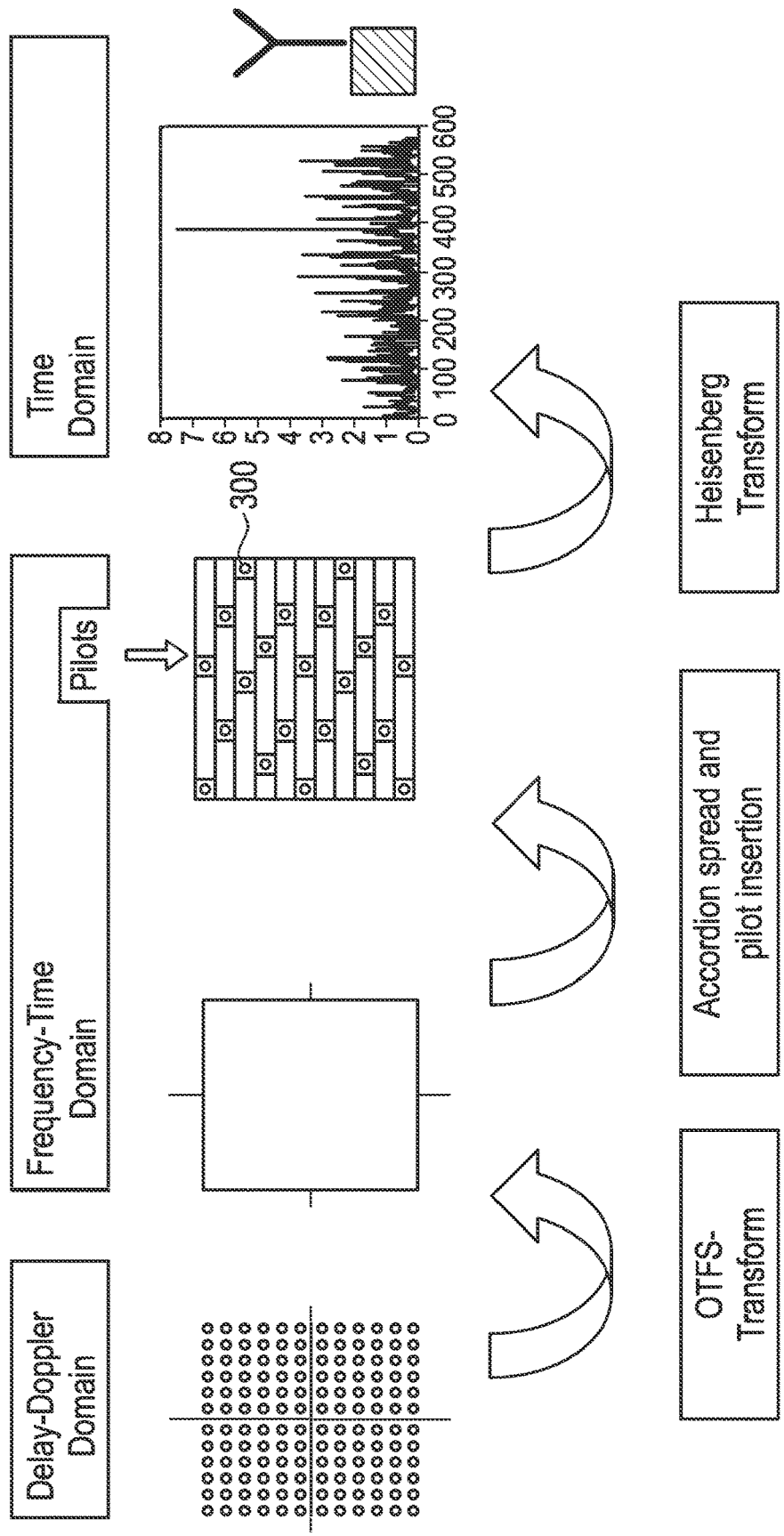
FIG. 9 depicts accordion pilot insertion at an OTFS transmitter in an exemplary embodiment.

FIG. 9 depicts accordion pilot insertion at an OTFS transmitter in an exemplary embodiment. FIG. 9 shows a similar representation as FIG. 8 with the DD-domain on the left, the TF-domain in the center and the TD-domain on the right. Similar to FIG. 8 pilot symbols 300 are inserted in the TF domain. In this exemplary embodiment, instead of appending the pilots, pilot symbols 300 are interleaved with the TF representation. In this exemplary embodiment the processing module 14 is configured to spread the TF representation having the first bandwidth and the first duration before adding the pilot symbols 300. The spreading is done in a way that gaps are opened for pilot insertion, thereby extending the representation in time dimension, in frequency dimension or both. For example, the TF representation as output by the OFTS-transform has a dimension of 512×512 samples. An accordion like spread may map the 512×512 to a larger grid, e.g., 520×520. Hence, for each sub carrier there are 8 extra grid points for pilot insertion and there are 8 extra sub carriers. In total an extra of 520×520−512×512=8256 pilot symbols 300 can be inserted, while the other samples can be shifted accordingly (in time and frequency dimension). The 520×520 grid is extended in frequency (bandwidth extension) and in time dimension (duration extension) in the TF domain.

In other exemplary embodiments, extensions in only one dimension are also conceivable, e.g., extending in the time domain only (e.g., 520×512) or in the frequency domain only (e.g., 512×520).

In a further exemplary embodiment the processing module 14 is configured to use an accordion-like spread to spread the TF representation having the first bandwidth or the first duration before adding the pilot symbols 300. Accordion-like spread means that a mapping on an extended representation is done, which allows to open up (or introduce) grid points for pilot insertion, while the original samples are shifted. For example, the TF representation having the first bandwidth and the first duration comprises a time-frequency grid, and the processing module 14 is configured to extend the grid to open up grid points for adding the pilot symbols 300.

The pattern of the pilot symbols can be adapted to the respective radio channel. For example, the processing module 14 is configured to add a pilot grid to the TF representation having the first bandwidth or the first duration, wherein spacings in the pilot grid are adapted to a coherence time of a wireless channel with reduced fast fading influence. Because of the later processing in the DD domain, multi path superposition can be resolved to a certain extent in some exemplary embodiments. As the superposition of multiple signal copies propagated along different paths (thereby experiencing different delays and Doppler shifts) is causing fast fading, the overall channel can be sampled at a lower sampling rate.

Figure 10:
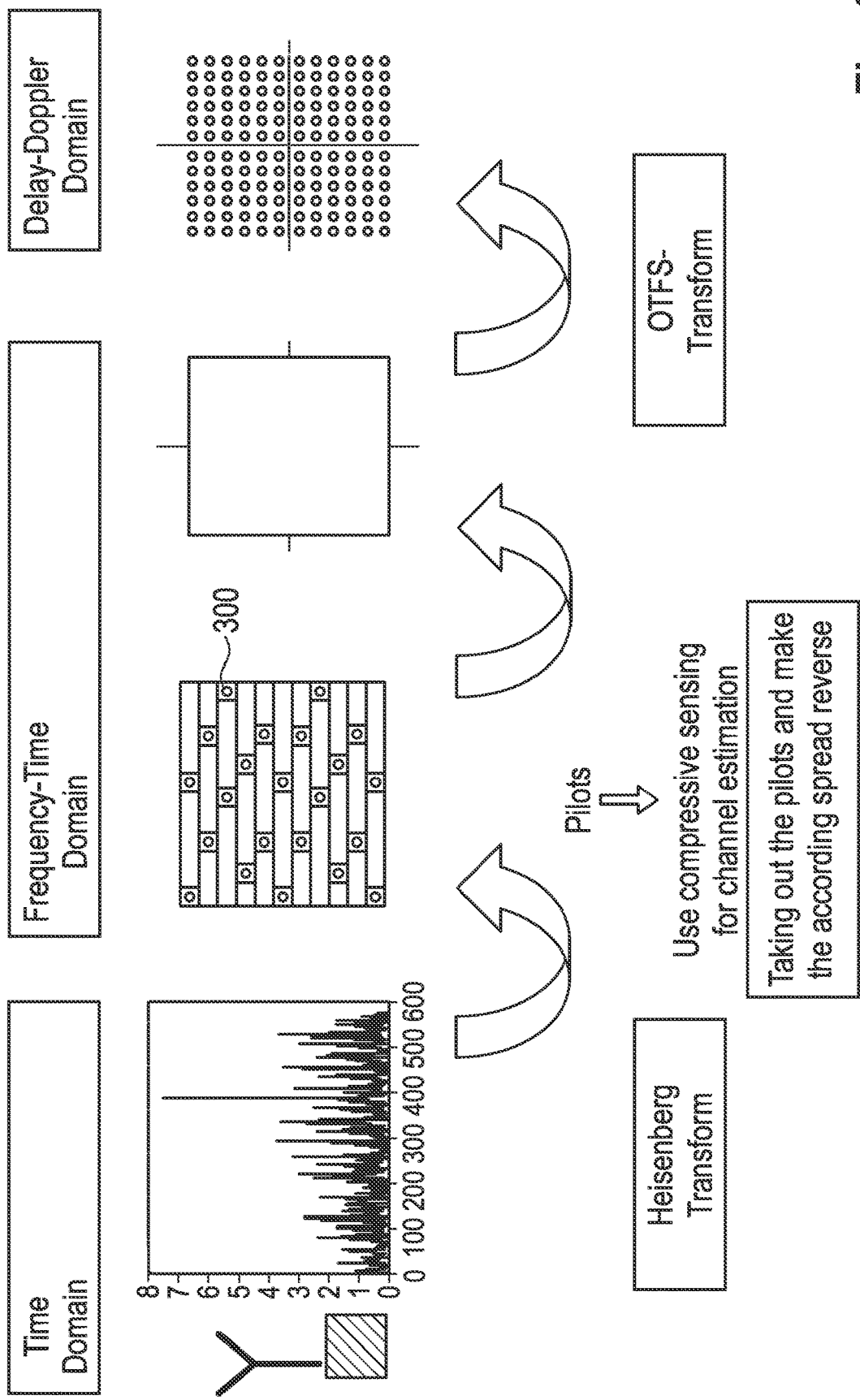
FIG. 10 shows accordion pilot reverse transformation and compressive channel estimation at an OTFS receiver in an exemplary embodiment.

FIG. 10 shows accordion pilot reverse transformation and compressive channel estimation at an OTFS receiver in an exemplary embodiment. FIG. 10 shows the time domain at the left, where the signal is received. The Heisenberg transform is then used to transform the TD representation into the TF domain. At the receiver the processing module 24 can be configured to estimate a wireless channel based on the pilot symbols 300 and to determine the estimated transmit symbols based on the estimated wireless channel. The pilot symbols 300 can be taken out of the TF representation and a de-spreading operation can be carried out resulting in a TF representation with the original bandwidth and/or duration (just like in FIG. 9 in center left), e.g., by deleting the gaps left by the pilot symbols removed. This TF representation can then be OFTS-transformed into the DD domain, where symbol detection can be carried out based on the estimated channel.

In some exemplary embodiments, the processing module 24 is configured to carry out compressed sensing of the wireless channel based on the pilot symbols. Therefore, exemplary embodiments may make use of pilot symbols, which are distributed over the entire TF domain. Compressive sensing may enable to use less pilot symbols and to increase the overall transmission efficiency (better quota of payload symbols versus pilot symbol). The processing module 24 may be configured to carry out the compressed sensing of the wireless channel based on the pilot symbols under the assumption that a representation of the wireless channel in the Delay-Doppler domain is sparse.

As indicated in FIG. 10 the TF representation having the extended bandwidth or the extended duration comprises a time-frequency grid, and the processing module 24 may be configured to delete the pilot symbols and pilot symbol grid points from the time-frequency grid to obtain the TF representation with the unextended bandwidth and/or the unextended duration.

Some exemplary embodiments use an accordion-like spread of the OTFS symbols in the TF-domain and place pilots for compressive channel estimation. For example, this may mean that just some pilots are used, less than usually 10% thanks to compressive sensing and the property of a sparse delay-Doppler domain.

FIG. 9 shows OTFS transmitter processing in an exemplary embodiment, where the pilots are inserted in the TF-domain by spreading the OTFS code words like an accordion. Due to the fact that compressive sensing is used at the receiver only few pilots are needed. FIG. 10 depicts the receiver processing, where the pilots are obtained in the TF-domain and the accordion spread is reversed. At the receiver, channel estimation is done by using compressive sensing based on the obtained pilots. After estimating the channel the equalization is done by an equalizer.

Compressive sensing is well-known but might not be applicable to OTFS in a straightforward manner. The accordion pilot insertion may enable compressive sensing in exemplary embodiments. Compressive sensing may allow drastically decreasing the number of pilots (<10%).

The facets and features mentioned and described together with one or more of the previously detailed examples and figures, may as well be combined with one or more of the other examples to replace a like feature of the other example or to additionally introduce the feature to the other example.

Examples may further be or relate to a computer program having a program code for performing one or more of the above methods, when the computer program is executed on a computer or processor. Operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative purposes to aid the reader in understanding the principles of the disclosure and the concepts contributed to furthering the art. All statements herein reciting principles and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal", etc., may be implemented as dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes or operations, which may, for instance, be substantially represented in computer readable medium and so executed by a computer or processor, whether or not such computer or processor is explicitly shown. Methods disclosed in the specification or in the claims may be implemented by a device having methods or mechanisms for performing each of the respective acts of these methods.

It is to be understood that the disclosure of multiple acts, processes, operations, or functions disclosed in the specification or claims may not be construed as to be within the specific order, unless explicitly or implicitly stated otherwise, for instance, for technical reasons. Therefore, the disclosure of multiple acts or functions will not limit these to a particular order unless such acts or functions are not interchangeable for technical reasons. Furthermore, in some examples a single act, function, processor operation may include or may be broken into multiple sub—acts, -functions, -processes, or -operations, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

LIST OF REFERENCE SIGNS

- 10 apparatus for a wireless transmitter device
- 12 transmitter module
- 14 processing module
- 20 apparatus for a wireless receiver device
- 22 receiver module
- 24 processing module
- 30 method for a wireless transmitter device
- 32 generating one or more transmit symbols in a Delay-Doppler domain to obtain a Delay-Doppler representation
- 34 transforming the Delay-Doppler representation into a Time-Frequency domain to obtain a Time-Frequency representation, the Time-Frequency representation having a first bandwidth and a first duration
- 36 adding pilot symbols to the Time-Frequency representation to obtain a Time-Frequency representation with an extended second bandwidth or an extended second duration
- 38 transforming the Time-Frequency representation with the extended second bandwidth or the extended second duration to the time domain to obtain a time domain representation
- 40 transmitting the time domain representation to a wireless receiver device
- 50 method for a wireless receiver device
- 52 receiving a time domain representation of a receive signal from a wireless transmitter device
- 54 transforming the time domain representation to a Time-Frequency representation, the Time-Frequency representation having an extended bandwidth or an extended duration
- 56 removing pilot symbols from the Time-Frequency representation to obtain a Time-Frequency representation with an unextended bandwidth or an unextended duration
- 58 transforming the Time-Frequency representation with the unextended bandwidth or the unextended duration into a Delay-Doppler domain to obtain a Delay-Doppler representation
- 60 determining estimated transmit symbols based on the Delay-Doppler representation
- 100 wireless transmitter device
- 200 wireless receiver device
- 300 pilot symbol
- 400 communication system

What is claimed is:

1. An apparatus for a wireless transmitter device, the apparatus comprising:
a transmitter module configured to transmit wireless transmissions; and
a processing module configured to control the transmitter module,
wherein, the processing module is further configured to, prior to transmission of a wireless transmission:
generate one or more transmit symbols in a Delay-Doppler domain to obtain a Delay-Doppler representation,
transform the obtained Delay-Doppler representation into a Time-Frequency domain to obtain a Time-Frequency representation of the generated one or more transmit symbols, the Time-Frequency representation having a first frequency bandwidth and a first time duration,
spread the Time-Frequency representation having the first frequency bandwidth, the first duration in time, or both, to generate resources in the Time-Frequency representation for insertion of pilot symbols,
add pilot symbols to the spread Time-Frequency representation to obtain a Time-Frequency representation with a second frequency bandwidth or a second time duration, wherein the second frequency bandwidth and the second time duration are extended relative to the first frequency bandwidth and first time duration, respectively;
transform the Time-Frequency representation with the extended second frequency bandwidth or the extended time second duration to the time domain to obtain a time domain representation with the extended second frequency bandwidth or extended second time duration; and
transmit the time domain representation with the extended second frequency bandwidth or extended time second duration to a wireless receiver device for subsequent processing to obtain the Time-Frequency representation with the first frequency bandwidth and first time duration.

2. The apparatus of claim 1, wherein the processing module is configured to use an accordion-shaped spread to spread the Time-Frequency representation having the first frequency bandwidth and the first time duration before adding the pilot symbols.

3. The apparatus of claim 1, wherein the Time-Frequency representation having the first frequency bandwidth and the first time duration comprises a time-frequency grid, and wherein the processing module is further configured to extend the grid to open up grid points for adding the pilot symbols.

4. The apparatus of claim 1, wherein the processing module is further configured to add a pilot grid to the Time-Frequency representation having the first frequency bandwidth and the first time duration, wherein spacings in the pilot grid are adapted to a coherence time of a wireless channel with reduced fast fading influence.

5. An access node of a wireless communication system comprising the apparatus of claim 1.

6. An access node of a wireless communication system comprising the apparatus of claim 1.

7. User equipment for a wireless communication system comprising the apparatus of claim 1.

8. An apparatus for a wireless receiver device, the apparatus comprising:
   a receiver module for receiving wireless transmissions; and
   a processing module configured to control the receiver module, to receive a time domain representation of a signal from a wireless transmitter device,
   wherein the processing module is further configured to:
      transform the received time domain representation to a Time-Frequency representation, the Time-Frequency representation having an extended frequency bandwidth or an extended time duration,
      de-spread the Time-Frequency representation having the extended frequency bandwidth, the extended duration in time, or both, to generate resources in the Time-Frequency representation with pilot symbols,
      remove pilot symbols from the Time-Frequency representation to obtain a Time-Frequency representation with an unextended frequency bandwidth and an unextended time duration,
      transform the Time-Frequency representation with the unextended frequency bandwidth or the unextended time duration into a Delay-Doppler domain to obtain a Delay-Doppler representation; and
      determine estimated transmit symbols based on the Delay-Doppler representation.

9. The apparatus of claim 8, wherein the processing module is further configured to estimate a wireless channel based on the pilot symbols and determine the estimated transmit symbols based on the estimated wireless channel.

10. The apparatus of claim 8, wherein the processing module is further configured to perform compressed sensing of the wireless channel based on the pilot symbols.

11. The apparatus of claim 10, wherein the processing module is further configured to perform the compressed sensing of the wireless channel based on the pilot symbols under the assumption that a representation of the wireless channel in the Delay-Doppler domain is sparse.

12. The apparatus of claim 8, wherein the Time-Frequency representation having the extended frequency bandwidth or the extended time duration comprises a time-frequency grid, and wherein the processing module is further configured to delete the pilot symbols and pilot symbol grid points from the time-frequency grid to obtain the Time-Frequency representation with the unextended frequency bandwidth and the unextended time duration.

13. User equipment for a wireless communication system comprising the apparatus of claim 8.

14. A method for a wireless transmitter device, the method comprising:
   generating one or more transmit symbols in a Delay-Doppler domain to obtain a Delay-Doppler representation;
   transforming the obtained Delay-Doppler representation into a Time-Frequency domain to obtain a Time-Frequency representation, the Time-Frequency representation having a first frequency bandwidth and a first time duration;
   spreading the Time-Frequency representation having the first frequency bandwidth, the first duration in time, or both, to generate resources in the Time-Frequency representation for insertion of pilot symbols;
   adding pilot symbols to the Time-Frequency representation to obtain a Time-Frequency representation with a second frequency bandwidth or a second time duration, wherein the second frequency bandwidth and the second time duration are extended relative to the first frequency bandwidth and first time duration, respectively;
   transforming the Time-Frequency representation with the extended second frequency bandwidth or the extended second time duration to the time domain to obtain a time domain representation with the extended second frequency bandwidth or the extended second time duration; and
   transmitting the time domain representation with the extended second frequency bandwidth or the extended second time duration to a wireless receiver device for subsequent processing to obtain the Time-Frequency representation with the first frequency bandwidth and the first time duration.

15. A non transitory computer readable medium including a computer program having a program code for performing at least one of the methods of claim 14, when the computer program is executed on a computer, a processor, or a programmable hardware component.

16. A method for a wireless receiver device, the method comprising:
   receiving a time domain representation of a receive signal from a wireless transmitter device;
   transforming the received time domain representation to a Time-Frequency representation, the Time-Frequency representation having an extended frequency bandwidth or an extended time duration;
   de-spreading the Time-Frequency representation having the extended frequency bandwidth, the extended duration in time, or both, to generate resources in the Time-Frequency representation with pilot symbols,
   removing pilot symbols from the Time-Frequency representation to obtain a Time-Frequency representation with an unextended frequency bandwidth and an unextended time duration;
   transforming the Time-Frequency representation with the unextended frequency bandwidth and the unextended time duration into a Delay-Doppler domain to obtain a Delay-Doppler representation; and
   determining estimated transmit symbols based on the Delay-Doppler representation.

17. A non transitory computer readable medium including a computer program having a program code for performing at least one of the methods of claim 16, when the computer program is executed on a computer, a processor, or a programmable hardware component.

* * * * *